Nov. 21, 1950     W. C. ANDERSON     2,531,099
SCREW FEEDING HOPPER
Filed May 10, 1946     7 Sheets-Sheet 1
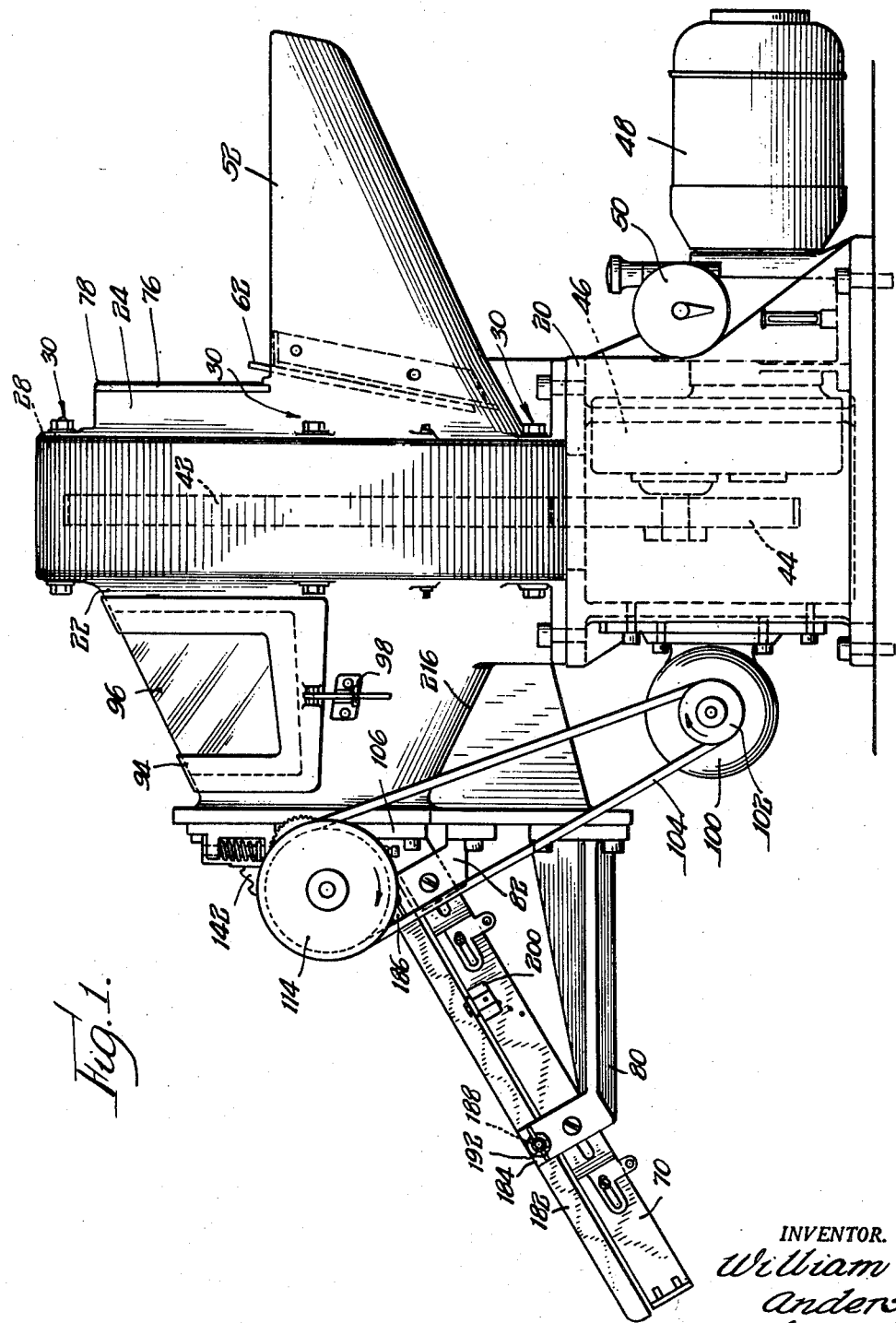
INVENTOR.
William C. Anderson
By: Moore, Olson & Trexler
Attys.

Nov. 21, 1950 W. C. ANDERSON 2,531,099
SCREW FEEDING HOPPER
Filed May 10, 1946 7 Sheets-Sheet 2
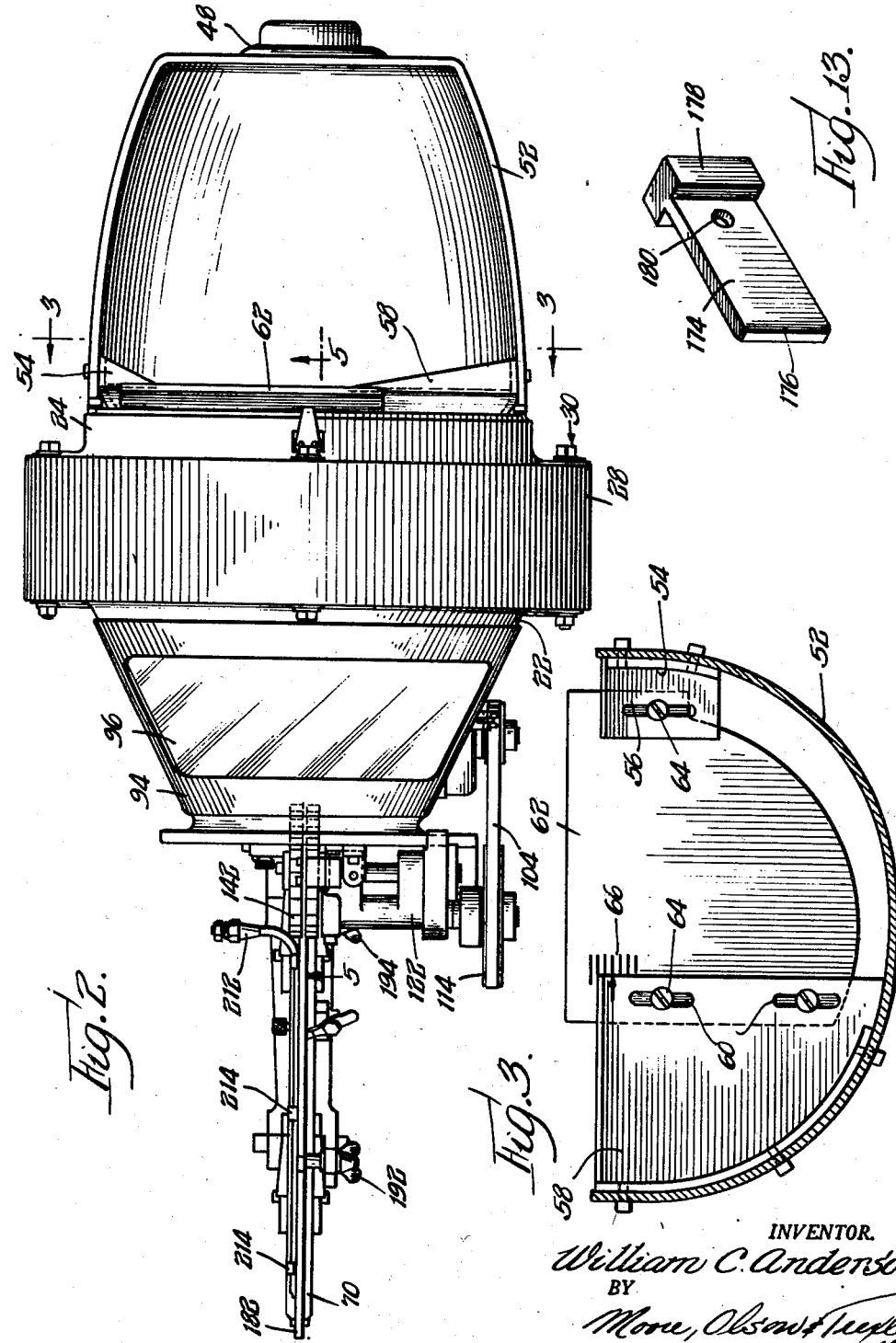
INVENTOR.
William C. Anderson
BY
More, Olson & Trexler
attys Nov. 21, 1950     W. C. ANDERSON     2,531,099
SCREW FEEDING HOPPER
Filed May 10, 1946             7 Sheets-Sheet 3
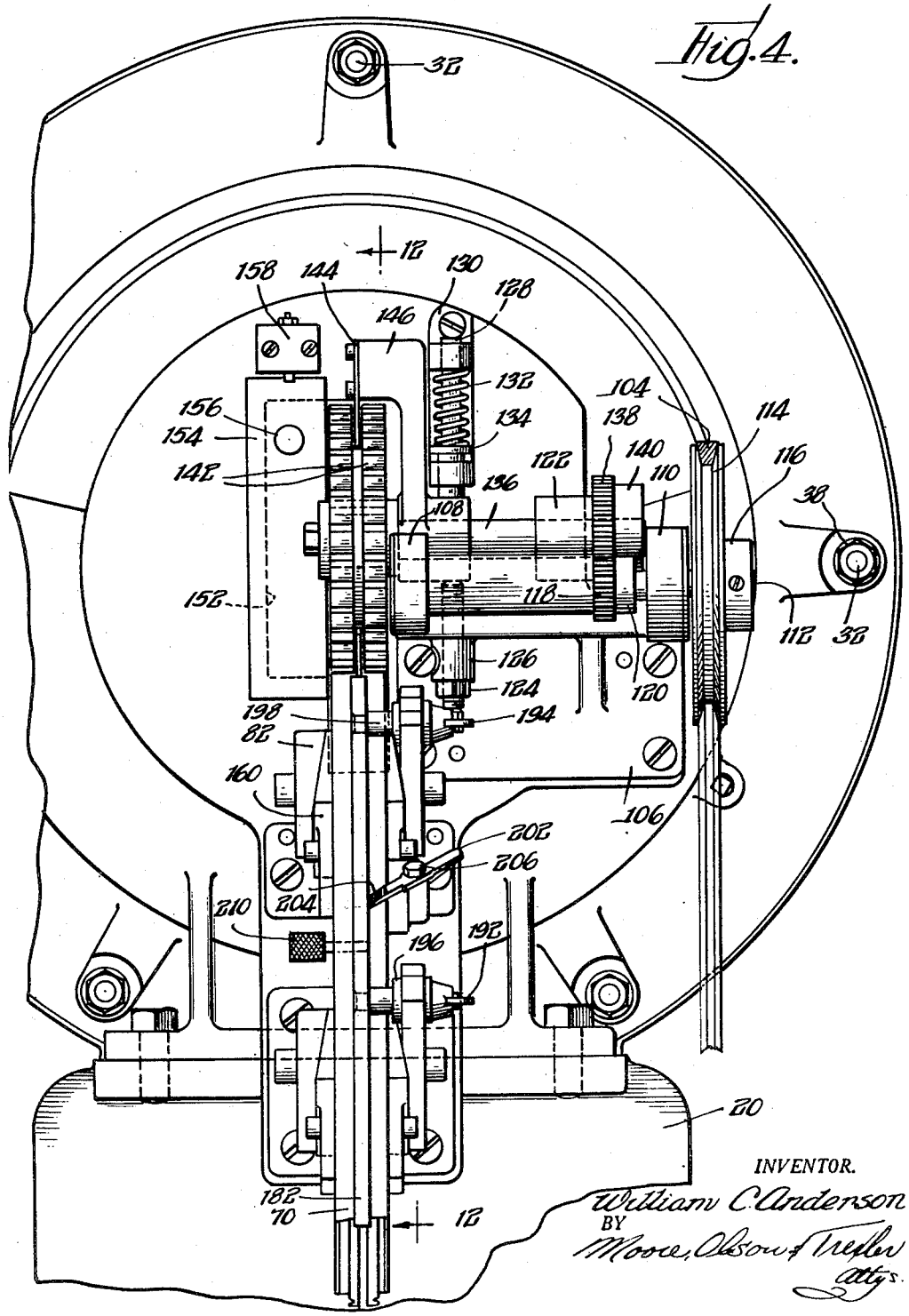

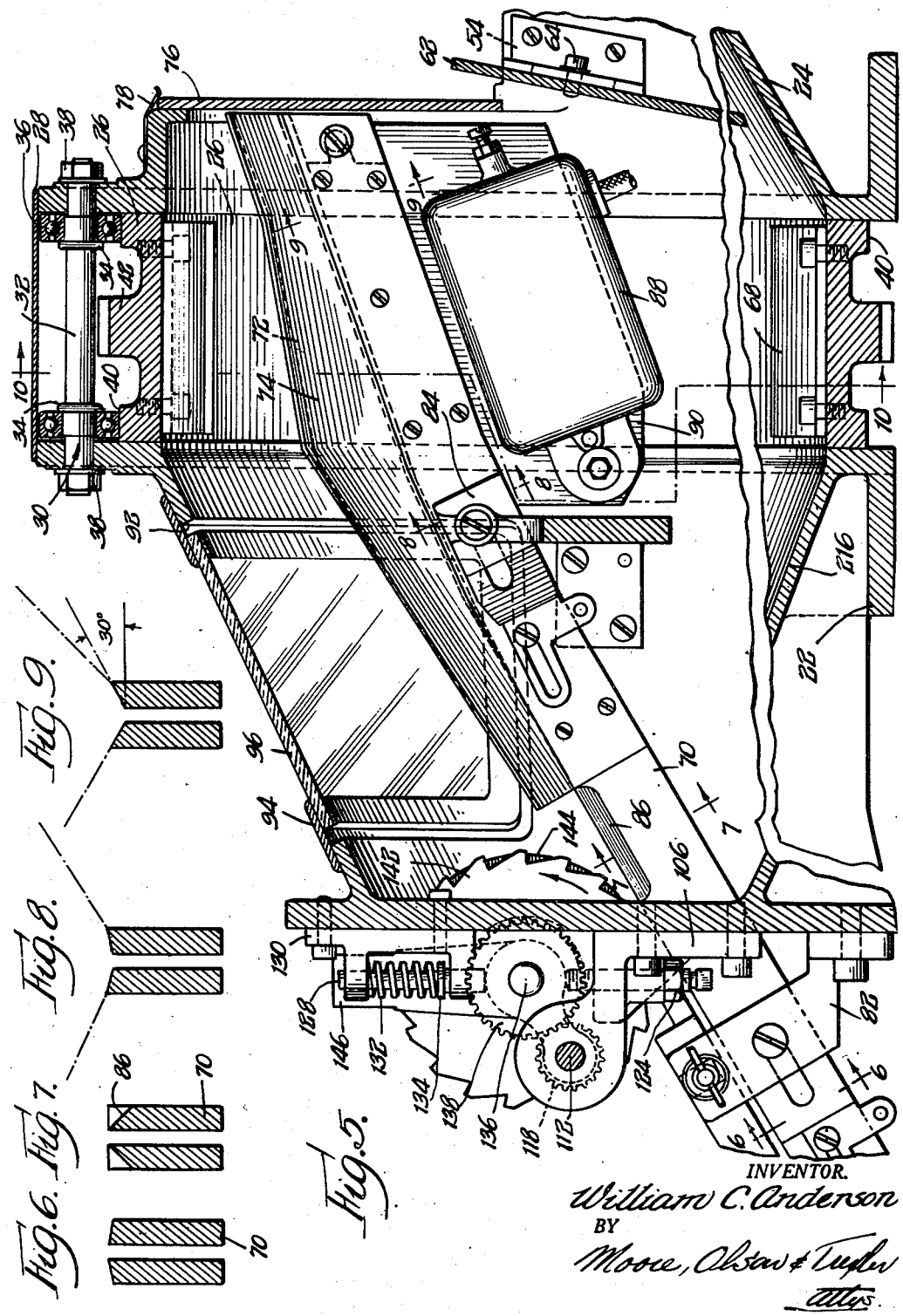

Nov. 21, 1950 W. C. ANDERSON 2,531,099
SCREW FEEDING HOPPER
Filed May 10, 1946 7 Sheets-Sheet 5

INVENTOR.
William C. Anderson
BY
Moore, Olson & Trexler
Attys.

Nov. 21, 1950 W. C. ANDERSON 2,531,099
SCREW FEEDING HOPPER
Filed May 10, 1946 7 Sheets-Sheet 6
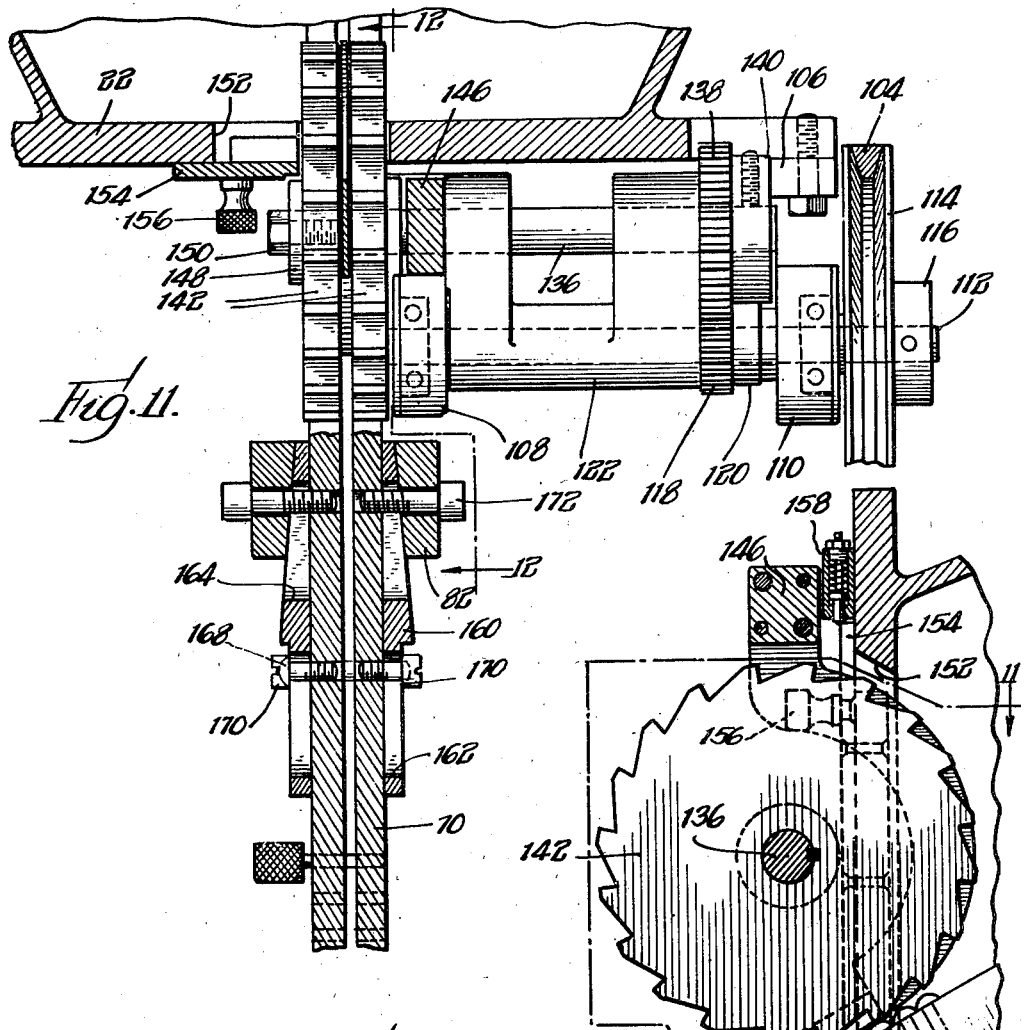
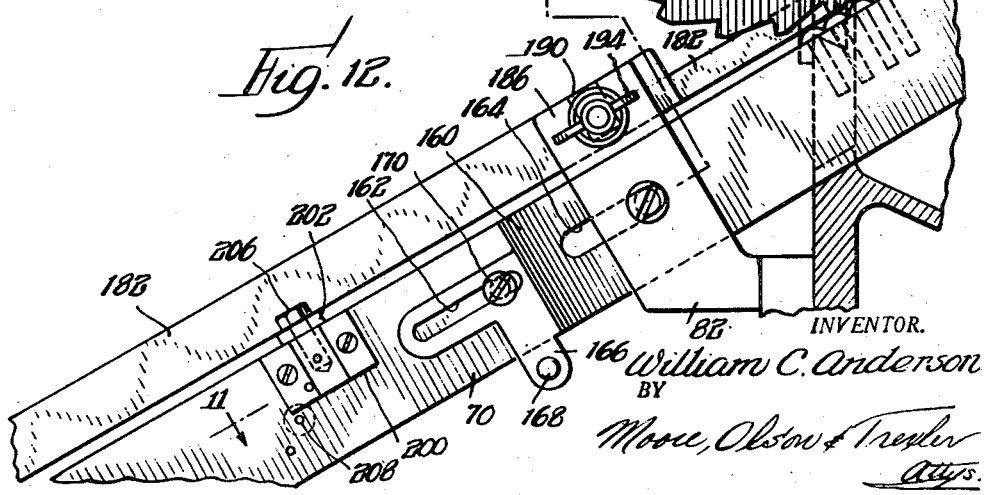
INVENTOR.
William C. Anderson
BY
Moore, Olson & Trexler
Attys.

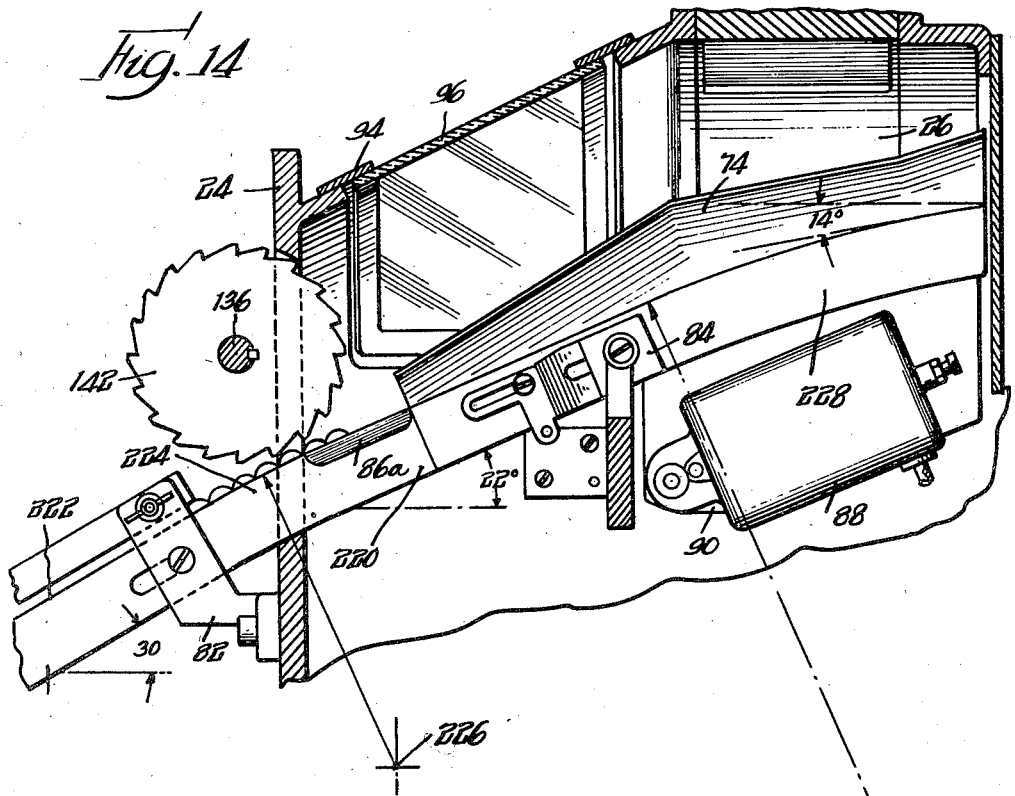
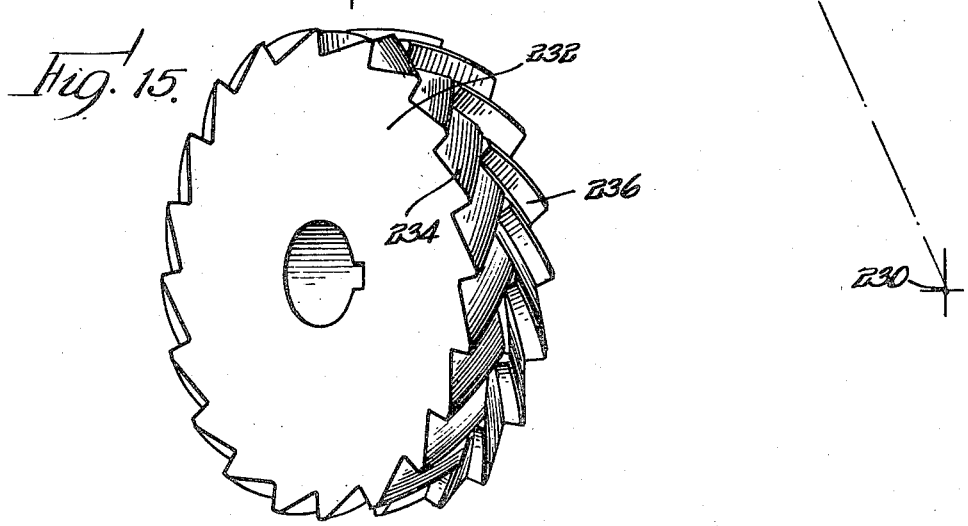

Patented Nov. 21, 1950

2,531,099

UNITED STATES PATENT OFFICE 2,531,099

SCREW FEEDING HOPPER

William C. Anderson, Oak Park, Ill., assignor to Illinois Tool Works, Chicago, Ill., a corporation of Illinois Application May 10, 1946, Serial No. 668,888

12 Claims. (Cl. 10—168)

The present invention relates to means for feeding headed fasteners such as rivets, bolts and screws, or screw blanks.

In the manufacture or use of rivets, bolts, screws or screw blanks, and in other manufacturing operations, it is desired to provide a mechanism or apparatus for feeding such fasteners at a high rate and in a uniform stream or oriented in a particular manner in order to take advantage of the high speed capabilities of associated manufacturing operations, and in order to minimize interruptions in the production line. Devices of this character are generally referred to as screw feeding hoppers although it is to be understood that this term applies not only to screws, but to screw blanks and to other headed bodies such as rivets, stove bolts, self-tapping fasteners and the like. One of the difficulties encountered in screw hoppers now in common use is the bunching of the headed fasteners or screw elements on the chute at the hopper exit and the consequent jamming of the clearing wheel.

Another disadvantage of the present devices are their relatively low feeding speed or capacity.

These and other disadvantages of the arrangements now employed are overcome by the present invention. Hoppers of the bucket drum type in use heretofore employ a drum which is mounted on a central shaft or axle and a hopper bowl or casting open on only one side or end, thereby clearly limiting the rate at which the screws are delivered by the drum to the rails. This limitation is avoided or overcome according to the present invention by the provision of a bucket drum so constructed that screws may be discharged in a plurality of directions or from a plurality of sides of the buckets to the rails.

The rails by which the screw elements have in the past been fed are generally positioned at an angle of approximately thirty degrees to the horizontal for their entire length. Screws which are dumped onto the top end of the chute from a mass in the hopper or scuttle flow in a bunch down the thirty-degree chute to the clearing wheel before they have had a chance properly to seat themselves on the chute rails with their shanks between the rails. This results in loss of efficiency, in low feeding rates and frequent jamming of the clearing wheel. This is obviated by the present invention by providing within the hopper chute rails which are of increasing inclination in the direction of feed of the screws.

Furthermore, in accordance with the present invention, the top surfaces of the rails are arranged at varying angles so as to assist in orienting the screws and also to assist in discarding certain unoriented screw elements prior to the time that the clearing wheel is reached.

Heretofore clearing wheels of different sizes and types to accommodate different sizes and types of screws have been provided but since it was a tedious and time consuming job to change clearing wheels and to adjust the new clearing wheel, operators of screw feeding machines avoid it whenever possible, with the result that the feeding efficiency is reduced and unnecessary breakdowns occur.

In accordance with the present invention this disadvantage is overcome by providing quickly changeable clearing wheels which are provided with a filler plate which is readily adjustable together with the wheels as a single unit.

Further in accordance with the present invention an arrangement is provided for the rapid adjustment of the spaces between the rails by means of improved gage blocks and adjusting wedges which are so arranged as to always center the rails relative to the hopper.

It, therefore, is an object of the present invention to provide an improved screw feeding hopper which is relatively fast and reliable in operation.

It is a further object of the present invention to provide an improved screw feeding hopper which will require a minimum amount of attention on the part of an operator and which can accommodate a larger amount of stock.

It is a still further object of the present invention to provide in a screw feeding hopper an improved arrangement for clearing wheels which will readily facilitate the adjustment thereof in accordance with different sizes and types of headed screw bodies to be processed.

Still another object of the present invention is to provide in a screw feeding hopper an improved arrangement which will substantially obviate bunching of the screw bodies in the screw chute.

Other and further objects of the present invention subsequently will become apparent by reference to the following description taken in conjunction with the accompanying drawings, wherein—

Figure 1 is a side elevation of the apparatus constructed in accordance with the present invention;

Figure 2 is a plan view of the apparatus shown in Figure 1;

Figure 3 is a cross-sectional view of the apparatus shown in Figure 2 as seen in the direction of the arrows along the line 3—3;

Figure 4 is a front elevation of the apparatus shown in Figure 1;

Figure 5 is a cross sectional view as seen in the direction of the arrows along the line 5—5 of Figure 2;

Figure 6 is a cross sectional view as seen in the direction of the arrows along the lines 6—6 of Figure 5;

Figure 7 is a cross sectional view as seen in the direction of the arrows along the line 7—7 of Figure 5;

Figure 8 is a cross sectional view as seen in the direction of the arrows along the line 8—8 in Figure 5;

Figure 9 is a cross sectional view as seen in the direction of the arrows along the line 9—9 of Figure 5;

Figure 11 is a cross-sectional view as seen in the direction of the arrows along the line 11—11 of Figure 12;

Figure 12 is a cross-sectional view as seen in the direction of the line 12—12 of Figure 4;

Figure 13 is a perspective view of a gage employed for adjusting the guide rails;

Figure 14 is a view in side elevation of a modified form of chute which may form part of the invention; and Figure 15 is a perspective view of a modified form of clearing wheel which may form part of the invention.

Figure 10:
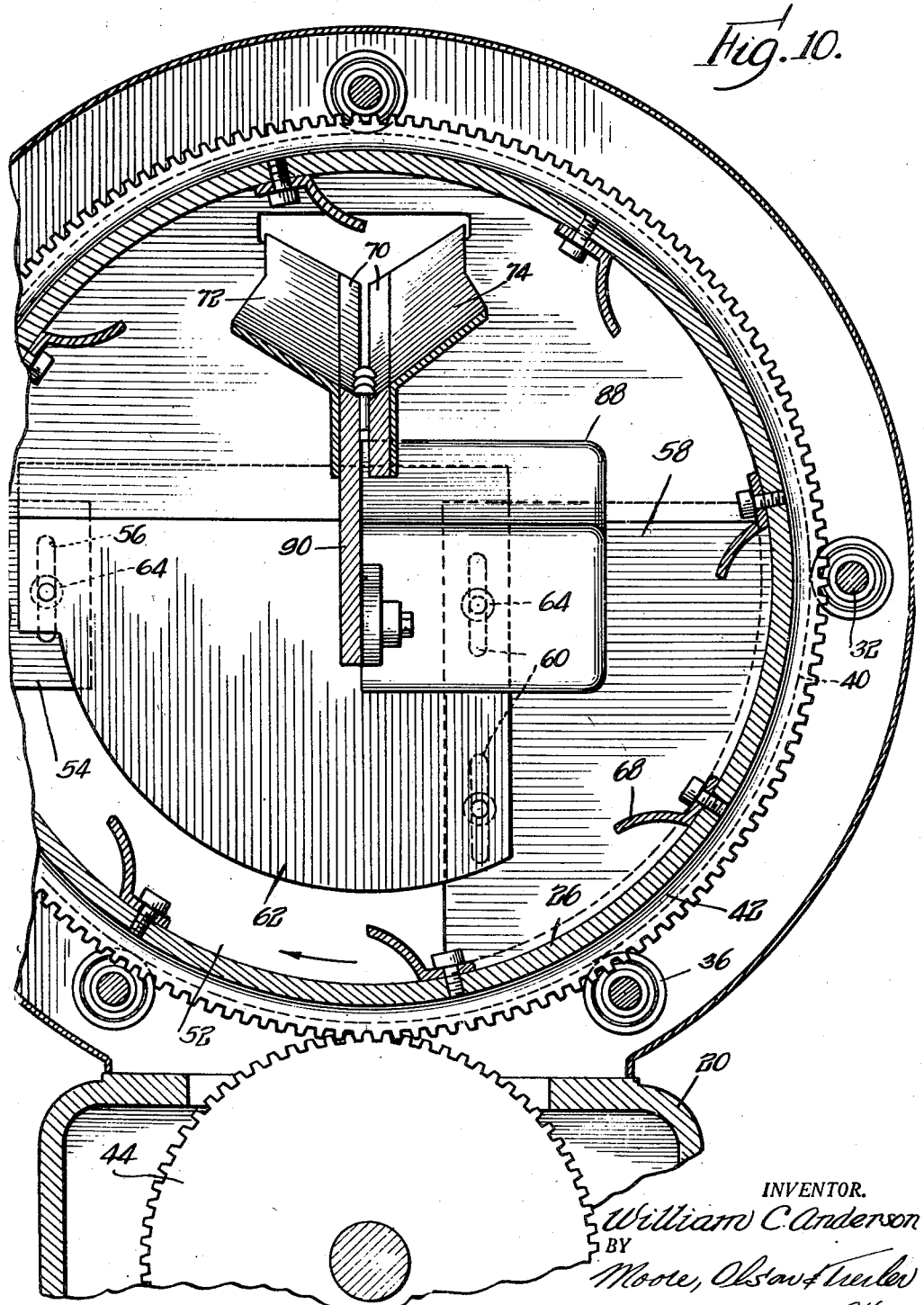
Figure 10 is a cross sectional view as seen in the direction of the arrows along the line 10—10 of Figure 5.

The automatic screw feeding hopper comprising the present invention has a base 20, shown in Figure 1, which supports a casing having a front portion 22 and a rear portion 24. The two casing portions house a revolving drum 26, shown in Figure 5, which is protected by an external cover 28. The drum 26 is supported, and the casing portions interconnected, by a plurality of bearing assemblies 30, shown in detail in Figure 5.

Each of these bearing assemblies consists of a shaft 32 having a plurality of thrust collars 34, each of which is engaged by a ball bearing 36. The shaft 32 is secured to the casing portions 22 and 24 by external nuts 38. The ball bearings 36 engage peripheral bearing surfaces 40 formed on the exterior of the revolving drum 26. The revolving drum 26 is provided with an annular gear 42 which is driven by a gear 44 contained within the base 20.

The gear 44 is driven by a variable speed transmission unit 46 powered by an electric motor 48. The transmission unit is provided with a suitable adjuster 50 so that the speed at which the gear 44 is driven may be controlled. For handling certain kinds of fasteners, it is preferred to employ a Graham variable speed unit, known as model 25MR7 using a one-sixth H. P., 1800 R. P. M. motor operating from a 220 volt, sixty-cycle three-phase alternating current line and capable of driving the drum at a speed between zero R. P. M. and thirty-one R. P. M. For handling fasteners which allow of a greater drum speed, a Graham unit, known as model 15DMR5 may be employed and an idler gear located between the gear 44 and the drum so that the drum may be driven at a speed between zero and one-hundred-ten R. P. M.

The casing portion 24 has an outwardly extending portion 52 which serves as a scuttle into which a supply of headed screw bodies is dumped for processing by the automatic screw feeding hopper. These screw bodies may be all screw blanks or may be screws or bolts which have already been threaded but which are to be provided with slots in the heads or shanks, as the case may be.

The scuttle 52 is so arranged as to supply, in accordance with different sizes, the proper amount of headed screw bodies to the hopper. This is accomplished by an adjustable closure or gate 62, shown in Figures 1, 2, 3 and 10. The scuttle 52 at one side is provided with a support bracket 54 having an elongated slot 56. At the other side of the scuttle 52 a large plate 58 is supported by fastening means. The plate 58 has a plurality of elongated slots 60. An adjustable plate or gate 62 is supported from the bracket 54 and the plate 58 by a plurality of cap screws 64. The gate 62 may be provided with suitable graduations 66 so that the gate may be readily adjusted in accordance with the type and size of headed screw bodies to be run through the apparatus. The bracket 54 and plate 58 may be cast in one piece as a bridge piece integral with and extending between the side walls of the hopper, the gate 62 being adjustably attached, in the manner shown, to said bridge piece.

The drum 26 is provided with peripherally arranged buckets 68 as may be seen from Figures 5 and 10 arranged to receive headed screw bodies from the opening between the bottom of the scuttle 52 and the bottom of the gate 62. This arrangement of the gate on the scuttle and the peripherally arranged buckets 68 on the drum 26 produces a periodic surge action of the screw bodies lying on the bottom of the drum. This surge action or wave flows up to the opening below the gate, and periodically agitates the mass of screw bodies contained in the scuttle 52. This surge action periodically agitates the mass of screw bodies in the scuttle so that they are fed to the drum without the need of manual or mechanical assistance.

The buckets 68 discharge screw headed bodies into a chute formed of a pair of rails 70 having side extensions 72 and 74 which form a valley. The one side of the valley formed by the extension 74 is preferably at a greater angle than the other side so that the discharged screw bodies will be carried equally by both sides of the valley. For example, it has been found in one embodiment that the side 72 should be at an angle of approximately thirty degrees whereas the side 74 should be nearly forty-five degrees.

As may be seen more particularly from Figure 5, the chute formed by the pair of rails 70 extends from the housing portion 24 through and from the housing portion 22. The inclination of the chute rails varies at different positions between the forward end of the housing portion 22 and the upper extremity of the chute.

From Figure 5 it will further be noted that the upper end of the chute terminates closely adjacent to the removable plate 76 which may be retained in place by a spring clip or latch 78. The chute is supported exteriorly of the hopper on the casing portion 22 by brackets 80 and 82, and interiorly of the hopper by a bracket 84.

The inclination of the chute exteriorly of the hopper preferably is of the order of an angle of thirty degrees with respect to the horizontal. The chute extends inwardly through the casing portion 22 at this same inclination, and in the proximity of the bracket 84, the inclination of the chute changes and still another change in inclination occurs in the proximity of the front edge of the drum 26. The inclination in the proximity of the bracket 84 has been found preferably to be within a range of twenty-six degrees to eighteen degrees, whereas the inclination of the chute through the drum 26 has been found preferably to be from twenty-two degrees to fourteen degrees. This change in the inclination of the chute from the priximity of the drum 26 to the exterior of the hopper has been found to produce certain unusual and unexpected beneficial results. The reduced inclination of the chute including the valley portions in the proximity of the drum 26 prevents piling up of the headed bodies as they pass down the chute and thereby reduces the possibility of providing sudden or intermittent heavy loads on the clearing wheel which is provided adjacent the opening between the exterior and interior of the housing 22.

Longitudinal portions of the upper edges of rails 70 are also inclined at different angles to the side surfaces of the rails, as shown in Figures 6, 7, 8 and 9. From Figure 6 it will be seen that the portions of the rails 70 outside of the hopper housing are provided with top surfaces which are divergent at a relatively wide angle so as adequately to support the screw heads during the feeding movement of the screws along the chute while minimizing the frictional resistance to such movement. Longitudinal portions of the rails within the hopper and in the proximity of the clearing wheel are divergent at a narrow or sharp angle to provide discharging surfaces 86 which present relieved surfaces at the outer edges of the rails to thus provide narrower top surfaces which permit unoriented screws, i. e. screws not properly seated in the chute, to fall off the rails into the casing portion 22 of the hopper to be returned by gravity to the rotating drum 26. From discharging surfaces 86 to the upper end of the chute, the top rail surfaces are convergent in varying degree, gradually increasing from a flat surface or 0 degrees to 30 degrees at the extreme upper end of the chute. At the support or bracket 84 the inclination of the top rail surfaces is as shown in Figure 8. At the upper extremity of the chute, the top rail surfaces are convergent at substantially thirty degrees, as shown in Figure 9. These convergent top rail surfaces have been found to contribute greatly to the rapid orientation or seating of the screws in the chute.

The upper end portion of the chute is subjected to the vibratory action of a motor or vibrator 88 which is mounted on a depending bracket portion 90 formed on the left-hand rail 70. While the motor 88 has been shown as being mounted on a projecting portion 90 formed integrally with one of the rails 70, it of course will be appreciated that a separate bracket might be provided for supporting the motor. The motor is of a type employed for producing vibrations of this kind and is available under the name "Syntron Vibrator."

The forward extending housing portion 22 is provided with an opening 92 which is closed by a cover 94 having an observation window 96. The cover 94 is retained in position by a suitable latch or fastening means 98, Figure 1. By means of this transparent cover the operation of the device may readily be observed.

The base 20 also supports a small motor 100 which, by means of a pulley 102 and a belt 104, drives the clearing wheel assembly. The motor 100 may be a 1/15 H. P. motor which operates directly from the 220-volt sixty-cycle three-phase alternating current circuit through the same switch which controls the operation of the motor 48.

The clearing wheel assembly is shown in Figure 1 and in considerable detail in Figures 4, 5, 11 and 12. The clearing wheel assembly is supported from the casing portion 22 by a bracket 106 which is provided with two bearing members 108, 110, Figures 4 and 11. The two bearing members support a shaft 112 which carries a pulley 114 secured to the shaft by a collar 116. The shaft 112 also carries a gear 118 secured thereto by a collar 120. Between the gear 118 and the other bearing member 108 there is loosely mounted on the shaft 112 a pivot bracket 122.

The pivot bracket 122 is adjustably positioned by a stop member 124, Figures 4 and 5, carried in a boss 126 forming a part of the bracket 106. The shaft bracket 122 is engaged on its top side by a spring biased plunger 128 supported in a suitable bracket 130. A spring 132 is interposed between the bracket 130 and a collar 134 formed on the plunger 128. The shaft bracket 122 carries a shaft 136 having secured thereto at one end a gear 138. The gear 138 is secured to the collar 140 which is secured to the shaft 136. The gear 138 meshes with the gear 118 so as to drive the shaft 136. The shaft 136 carries a clearing wheel 142 which projects through a suitable opening in the casing 22. The wheel 142 is grooved so as to provide clearance for a filler plate 144 mounted on a bracket 146. The bracket 146 is an extension of the pivot bracket 122. The wheel 142 is formed, on opposite sides of the groove, with teeth for removing improperly arranged or unoriented headed body members such as the screw blanks or screws to be processed. The wheel 142 may readily be removed by removing the end plate 148 and the nut 150, Figure 11. In order that the wheel may readily be removed a suitable opening 152, Figures 4 and 11, is formed in the casing 22 and is closed by a plate 154 provided with a suitable knob or handle 156. The plate 154 is retained in position by a latch 158. It will be noted that the clearing wheel 142 may be adjusted in position relative to the rails 70 so that proper clearance is provided for the headed bodies which are properly oriented between the rails 70. The filler plate 144 carried by the bracket portion 146 is moved together with the wheel 142 as a unit whenever the adjustable stop 124 is adjusted. The clearing wheel 142 rotates at a speed of several hundred R. P. M., in one embodiment 422 R. P. M., to return to the hopper and rotating drum any screw bodies which are not properly positioned or oriented between the rails 70.

The opening 152 and plate 154 may, however, be eliminated. The wheel is then simply pulled out, rotating bracket 122 on its shaft 112, plunger 128 and spring 132 being so proportioned as to permit this. The wheel is then removed from the end of the shaft, a new wheel bolted on, and bracket 122 (with wheel attached) is then pushed back into position, plunger 128 being raised by a knob (not shown) to permit this.

The rails 70 which are supported by the brackets 80, 82 and 84 are mounted so that the distance between the rails can be adjusted to accommodate different sizes of screw bodies. At each of these supports adjusting wedges are provided by which the distance between the rails 70 may be varied. Since the adjusting means at each of the supports is similar, it is believed necessary to describe only one such adjusting arrangement which is shown clearly in Figure 11. From Figure 11 it will be noted that the inner surfaces of the bifurcated bracket 82 are inclined or convergent toward the hopper. Cooperating with the inclined inner surfaces of the bracket 82 is a pair of wedges 160 having similarly inclined inner surfaces. Each of the wedges, as may be seen from Figure 12, is provided with two slots 162 and 164 extending in the longitudinal direction of the rails 70. Each wedge is provided with a depending ear 166. One of the wedges has a pin 168 secured to its ear so that the stem of the pin passes through the aperture and the ear of the other wedge. The pin 168 therefore insures that both wedges will be adjusted the same amount at the same time. Each wedge 160 is secured in position by a cap screw 170 which is received in its rear slot 162 and engages a threaded aperture in one of the rails 70. A cap screw or stud bolt 172 passes through a suitable opening in each furcation of the bracket 82 and through the slot 164 of the mating wedge into a threaded aperture in one of the rails 70.

In the smaller hoppers, the pair of wedges on each side of the rails at the brackets 80 and 82 may be made in one piece and adjusted simultaneously.

In order that the rails may be adjusted uniformly throughout their length a plurality of gage blocks are employed such as shown in Figure 13. The gage block has a body 174 of generally quadrangular configuration which may be slightly tapered at one end as at 176. The body 174 has a head 178, and immediately beneath the head there is provided a transverse hole 180 for hanging of the gage on a suitable pin on or adjacent the machine. When the cap screws 170 and 172 are loosened the wedges 160 may be withdrawn toward the front or lower end of the machine thereby to widen the space between the rails 70. The gage block shown in Figure 13 is inserted between the rails, and the wedges are then moved in the opposite direction until the rails 70 abut the sides of the gage block with the proper degree of fit customarily employed when using gage blocks in this manner. Thereupon the cap screws 170 and 172 are tightened and the rails therefor are spaced the proper distance. Due to the simultaneous operation of the two wedges, the center line between the rails remains constant and in alignment with the rest of the apparatus.

Immediately above the center of the rails 70, between the bracket 82 and the outer extremity of the rail 70, there is located a guide and guide rail member 182, Figures 1, 2, 4 and 12. This rail 182 is carried by upward extensions 184 and 186 of the brackets 80 and 82 respectively. The supports 80 and 82 at these points are provided with notches 188 and 190, respectively, Figures 1 and 12, so that the member 182 may be moved up and down relative to the chute rails 70. The member 182 is retained in position by tightening thumb screws 192 and 194 which act on the threaded portions of studs 196 and 198, Figure 4, which are secured to the guard plate 182. The plate 182 is positioned just above the tops or heads of the screws or screw blanks which pass down between the rails 70, thereby to keep them in alignment with their shanks approximately perpendicular to the top edges of the rails. This plate remains in a position in the central plane of the rails as the rails are adjusted toward and from each other by the wedges, previously described.

At a point intermediate the supports 80 and 82 a boss or bracket 200, Figures 1 and 12, is mounted for supporting pivotally an adjustable lever or stop member 202, Figures 4 and 12. This pivoted stop member 202 has a tapered or bevelled end 204 which extends into the path of the heads of screws moving down the rails 70. By means of a cap screw 206, this stop member is clamped in adjusted position so that screws having heads which are larger than the standard diameter for screws of the size and type being fed are held against further movement along the chute and must be manually removed. This prevents the feeding to a subsequent processing machine, a blank or screw member which cannot properly be handled by it. The opposite rail 70 in the proximity of the lever 202 is provided with a plurality of vertically spaced apertures 208, Figure 12, for receiving a stop pin 210, Figure 4. This stop pin prevents the feeding of screw blanks or screws 70 having body lengths greater than the standard. Therefore any screws which deviate from the prescribed standard in the size of the head or length of the body are stopped by these devices.

Along one of the rails 70 a blow pipe 212, Figure 2, is mounted by means of a plurality of clamps 214. The blow pipe is connected to a suitable source (not shown) of air under pressure and has a series of nozzles blowing on the heads of the screws, tending to force them quickly down the chute. This device is used when the screws have a tendency to move sluggishly down the chute, due to sticky oil or other cause.

The variable speed unit 46 is provided with a suitable control 50 so that the drum 26 of the hopper may be driven at any selected speed. Different speeds of operation are required for handling different sizes of screws. The adjustable gate 62 of the scuttle 52 is moved to a selected position dependent upon the size of the screws or screw blanks to be processed by the hopper. Dependent upon the type of screw blank or head employed and the size thereof, a selected clearing wheel 142 is mounted on a shaft 136. The rails 70 of the chute are adjusted so as to be properly spaced to accommodate the shank of the headed screw body. The guard rail 182 is adjusted as to its spacing above the rails 70 to accommodate the heads of the screw elements.

The clearing wheels 142 may be raised or lowered in accordance with the size and shape of the heads of the screws or screw blanks to be handled. Due to the provision of the pivoted shaft bracket 122 and the cooperating, adjustable stop 124, the position of the clearing wheel 142 may be adjusted without affecting the adjustment of the belt 104 or the position of the motor 100. Therefore the belt tension remains constant at all times. When the clearing wheel 142 is raised or lowered, the filler plate 144 is simultaneously raised or lowered so that the entire adjustment is accomplished by a single means.

As the drum 26 rotates and the buckets 68 pass through the mass of screw elements lying in the bottom of the drum, the mass surges back and forth with a wave motion, and swirls against the screws in the scuttle at the opening below the gate. This swirling action insures constant and uniform feeding of the screw elements into the buckets in the proper quantity, if the gate or regulating plate 62 is properly adjusted.

A quantity of screw blanks or headed screw bodies is placed in the scuttle 52 and the drum 26 rotates to cause the buckets 68 to supply the blanks or headed screw bodies to the valley formed at the upper portion of the chute by the side extensions 72 and 74. The inclination of the side extension 74 at a greater angle than the extension 72 insures a uniform distribution of the headed screw bodies within the valley and therefore prevents "bunching up" on the extension 74. As the vibrating motor 88 agitates or vibrates the upper end of the chute, the screw elements move in a relatively steady stream down the valley and onto the rails 70. Any screw elements which do not have their shanks located between the rails 70 will fall off the chute along the outwardly inclined surfaces 86 just preceding the clearing wheel 142. Any other screw blanks or headed screw elements which are not properly oriented in the chute rails 70 are then acted on by the clearing wheel 142. This wheel throws the blanks back into the housing 22 which has an inclined bottom portion 216 so that these blanks are returned to the feed drum and may again be scooped up by the buckets 68. Since the wheel 142 is only required to remove those blanks which are not properly seated on the rails 70 and is not required to remove, as in previously known hoppers, a mass of blanks or screw elements which do not have any portion of their shanks positioned between the rails 70, the wheels 142 may be driven at a constant speed by means of a relatively low power motor.

The present arrangement has been found to handle and feed headed screw elements, such as threaded screws and unthreaded screw blanks, at a tremendously greater rate of speed than heretofore possible. In one embodiment the device fed screw elements of certain sizes and types at a rate between three and five hundred per minute and other types and smaller sizes at a rate from fifteen hundred to two thousand per minute.

A change of the clearing wheel, filler plate and cover rail 182 only is required to adjust the machine for handling screws which differ in the head shape or size. This can be accomplished in as little as five minutes. When the apparatus is to be adjusted to handle a completely different type of blank or screw, the additional necessary changes or adjustments in the control plate 62, the rails 70, the guard 182, and the clearing wheel 142 could all be accomplished in the short time of twenty-five minutes. Thus in a relatively small space of time, it is possible completely to adjust the screw feeding hopper to accommodate an entirely different type of headed screw element.

As shown in Figure 14, the section 220 of the chute, just within the housing portion 24 of the hopper, is connected to the portion 222 of the chute external to the hopper by a curved section 224. As shown in the drawing, this section 220 is preferably inclined at an angle of 22 degrees, while section 222 is inclined at an angle of 30 degrees and the two sections are connected by the curved portion 224 which is formed on a short radius from an imaginary center 226 relatively adjacent the chute. The section 220 merges at its upper end, adjacent the supporting bracket 84, into a curved section 228. The section 228 is formed by a large radius from an imaginary center 230 relatively remote from the chute. As indicated in the drawing, the tangent to the curve of the section 228 at the upper end thereof is inclined to the horizontal at an angle on the order of 14 degrees.

The section 220 may, adjacent the clearing wheel but within the housing, have its upper edges cut away to form sharply divergent surfaces 86a corresponding to the divergent surfaces of the chute arrangement shown in Figure 5.

It has been found by actual use of a hopper embodying the chute arrangement shown in Figure 14, that the feeding of screws which are the most difficult types to feed is materially speeded up by that chute arrangement. The screws discharged from the rotating bucket drum onto the curved section 228 of the chute are delayed just sufficiently, or advanced down the chute just at a proper rate, so that the maximum number of them seat themselves properly on the chute with their shanks between the chute rails. The section 220 speeds up the flow of screws down the chute so that they do not bunch up due to too slow movement down the chute after they have become properly seated on the chute, and yet the screws which are not properly oriented are not fed so rapidly by this section that they bunch up in front of and jam the clearing wheel. Having passed the clearing wheel, the screws are again accelerated by the sharper inclination of the chute rails so as to always insure sufficient space to the rear of the clearing wheel for screws which are properly oriented on the chute to pass unhindered through the clearing wheel area.

Certain short, "top heavy" screws are most difficult to handle with the conventional or standard straight-tooth clearing wheel, as shown in Figures 4, 5, 11 and 12. It has been found that such screws may be readily handled by the "Bohle herringbone" clearing wheel shown in Figure 15. As shown in Figure 15, this clearing wheel 232 is provided with axially spaced sets of teeth 234 and 236. These teeth are spiral in form, similar to the teeth of a spiral gear, but the teeth of the set 234 are staggered peripherally of the wheel with respect to the teeth of the set 236. These sets of teeth are spaced apart in a direction axially of the wheel to form a peripheral groove similar to the central peripheral groove of the clearing wheel 142.

While for the purpose of illustrating and describing the present invention, a preferred embodiment has been shown, it is to be understood that the invention is not to be limited thereby, since such variations in the instrumentalities employed and in their arrangement are contemplated as are commensurate with the spirit and scope of the invention set forth in the following claims. It furthermore is to be understood that the values stated as to size, speed of operation, and the like, are illustrative and are not to be deemed limitations.

This invention is hereby claimed as follows:

1. In a screw element feed hopper having a housing, an inclined chute having a pair of inclined rails for feeding screw elements by their heads, means in the housing for feeding screws to said chute, said rails having top surfaces which for a longitudinal portion of the rails converge at an angle progressively increasing in the direction of feed of the screws along the chute.

2. In a screw element feed hopper having a housing, an inclined chute having a pair of inclined rails for feeding screw elements by their heads, means in the housing for feeding screws to said chute, said rails having top surfaces which for a longitudinal portion of the rails converge at an angle progressively increasing in the direction of feed of the screws along the chute and merge into a longitudinal portion in which the top surfaces of the rails diverge.

3. In a screw element feed hopper having an inclined feed chute, hopper means for feeding screws from a mass onto the chute, an adjustably positioned toothed clearing wheel, said clearing wheel having an annular groove, an arcuate filler plate cooperating with said annular groove, said clearing wheel arranged for cooperation with said inclined chute to discharge from the chute screw elements not properly oriented relative to the chute for feeding therealong, said filler plate being adapted to clear screw elements from said clearing wheel, said clearing wheel being removably secured to a shaft on which it rotates, and means for simultaneously, pivotally adjusting the position of said clearing wheel and said filler plate relative to said chute.

4. In a device for feeding head screw elements or the like, a pair of parallel inclined feed rails for conveying the elements by their heads and spaced apart to receive the shanks of the elements between them, a clearance mechanism for said rails comprising a pair of rotary clearing wheels, a stationary support, a bracket pivotally mounted on said support for shifting toward and from the rails, a clearing wheel drive shaft journalled on said bracket, means for removably securing said clearing wheels in spaced relation to said shaft for rotation therewith and in overlying relation to said rails, a stationary filler plate mounted on said bracket and extending between said clearing wheels, said filler plate having an arcuate surface spaced inwardly from the periphery of said clearing wheels to clear the head of screw elements or the like properly seated on said rails for gravity movement down said rails, means for driving said clearing wheel drive shaft, and means for pivotally adjusting the position of said bracket, thereby simultaneously to adjust the position of said clearing wheels and said filler plate relative to said rails.

5. In a device for feeding headed screw elements or the like, a pair of parallel inclined feed rails spaced apart to receive the shanks of the elements, and means for supporting said rails including a pair of upstanding fixed supporting arms having internal wedge surfaces, a pair of blocks on opposite sides of said rails and having external wedge surfaces, said blocks being slidably mounted in said supporting arms for adjustment relative thereto, said blocks being interconnected whereby simultaneously to adjust said rails relative to each other about a fixed central line on slidable adjustment of said blocks relative to said rail supporting arms.

6. In a device for feeding headed screw elements or the like, a feed drum receiving a mass of screw elements in the lower portion thereof, said drum being mounted for rotation in angularly spaced bearing members engaging the external periphery of the drum, said drum having a plurality of angularly spaced internal buckets, means forming a housing extending from one end of said drum, an inclined feed chute including a pair of spaced rails for conveying headed screw elements or the like by their heads and with their shanks between the rails, said rails extending through the drum from end to end thereof and through and beyond said housing to a discharge point exteriorly of the housing, said rails having within said drum a pair of opposite upwardly projecting side extensions for directing screw elements projected from the buckets onto the rails, said rails having converging top surfaces which are laterally inclined to the horizontal at angles of the order of 30° at a point in the proximity of the drum and which progressively decrease in lateral inclination as the rails approach their point of passage from the housing, said side extensions terminating inwardly of the point of passage of the rails from the housing and said rails adjacent but beyond the termination of said side extensions and within the housing having laterally divergent top surfaces to discharge from the chute rails screw elements or the like not having shanks extending between the rails.

7. In a device for feeding headed screw elements or the like, a revolving cylinder open at both ends and having angularly spaced internal feed buckets, said cylinder being mounted on a plurality of angularly spaced external bearings, an inclined screw feeding chute extending through said cylinder from end to end thereof to receive screw elements or the like from the buckets and beyond said cylinder to a discharge point, a clearance mechanism mounted in operative relation to said chute between said discharge point and said cylinder to prevent screw elements or the like not properly positioned in the chute from passing along the chute to the discharge point, said chute having portions of different longitudinal inclination to the horizontal varying from an angle in the range of 14°–22° within the cylinder to an angle of the order of 30° at the clearance mechanism.

8. In a device for feeding headed screw elements or the like as set forth in claim 7, wherein the chute is provided with an intermediate portion between the portion within the cylinder and the clearance mechanism which is longitudinally inclined to the horizontal at an angle within the range of 18°–26°.

9. In a device for feeding headed screw elements or the like as set forth in claim 7, wherein the rails are provided with opposite upwardly projecting side extensions for directing screw elements projected from the buckets onto the rails and wherein the extension toward which the elements are projected on discharge from the buckets is inclined to the horizontal at an angle of the order of 45° and the opposite side extension is inclined to the horizontal at an angle of the order of 30°.

10. In a device for feeding headed screw elements or the like, a rotating drum having a plurality of internal feed buckets, a supply scuttle mounted in operative relation to the drum to supply screw elements or the like to the lower portion of said drum, an inclined feed chute extending from a point within the drum to receive screw elements from the buckets of the drum to a discharge point beyond the drum, said chute comprising a pair of spaced inclined rails for conveying the elements by their heads and with their shanks between the rails, said rails being provided with upwardly and outwardly projecting side extensions forming a valley to facilitate proper orientation of the screw elements or the like relative to the chute for feeding by the rails of the chute, means forming a housing extending from one end of the drum and enclosing a portion of the chute beyond the drum, said chute rails passing from the housing to said discharge point, said housing having means therein for receiving and returning to the lower portion of the drum screw elements or the like discharged from the chute rails within the housing, said chute rails having within said drum and housing portions of different longitudinal inclination to the horizontal, the portion of least inclination being located within the drum and the portion of greater inclination being located at the point where the chute rails pass from the housing, a clearing wheel mechanism mounted above the chute at the point where the chute passes from the housing and projecting into said housing for discharging improperly oriented screw elements or the like from the chute, said chute rails within said drum and housing having converging top surfaces laterally inclined at an angle to the horizontal, progressively decreasing in the direction of feed of the screw elements or the like along the chute rail, said side extensions of the chute rails and said convergent top surfaces of the rail terminating within the housing in advance of the clearing wheel mechanism and said chute rails beyond said side extensions and in advance of said clearing wheel mechanism having their top surfaces inclined away from each other to provide additional means for discharging from the chute screw elements or the like not properly oriented relative to the chute.

11. In a screw element feed hopper having a housing, an inclined chute having a pair of inclined rails for feeding screw elements by their heads, means in the housing for feeding screws to said chute, said rails having top surfaces which for a longitudinal portion of the rails converge at an angle progressively increasing in the direction of feed of the screws along the chute and merge into a longitudinal portion in which the rails are relieved at the outer sides thereof to present narrower top surfaces.

12. In a device for feeding headed screw elements or the like, a feed drum receiving a mass of screw elements in the lower portion thereof, said drum being mounted for rotation in angularly spaced bearing members, said drum having a plurality of angularly spaced internal buckets, means forming a housing extending from one end of said drum, an inclined feed chute including a pair of spaced rails for conveying headed screw elements or the like by their heads and with their shanks between the rails, said rails extending through the drum and through and beyond said housing to a discharge point exteriorly of the housing, said rails having within said drum a pair of opposite upwardly projecting side extensions for directing screw elements projected from the buckets onto the rails, said rails having the inner sides of the top surfaces thereof relieved and extending along the bottoms of said extensions which said extensions terminate inwardly of the point of passage of the rails from the housing, and said rails adjacent but beyond the termination of said extensions and within said housing having the outer sides thereof relieved to present narrower top surfaces facilitating discharge therefrom of screw elements or the like not having shanks extending between the rails.

WILLIAM C. ANDERSON.

REFERENCES CITED

The following references are of record in the file of this patent:

UNITED STATES PATENTS

| Number | Name | Date |
|---|---|---|
| 323,081 | Smith | July 28, 1885 |
| 437,073 | Wolcott | Sept. 23, 1890 |
| 627,341 | Knight | June 20, 1899 |
| 712,866 | Tobey | Nov. 4, 1902 |
| 757,676 | Pierce | Apr. 19, 1904 |
| 867,404 | Nilson | Oct. 1, 1907 |
| 1,336,785 | Matler | Apr. 13, 1920 |
| 1,372,255 | Stone | Mar. 22, 1921 |
| 1,444,871 | Goddu | Feb. 13, 1923 |
| 1,687,134 | Lynch et al. | Oct. 9, 1928 |
| 1,692,456 | Lynch | Nov. 20, 1928 |
| 1,779,866 | Wilcox | Oct. 28, 1930 |
| 1,799,342 | Wilcox | Apr. 7, 1931 |
| 2,015,892 | Greenlaw | Oct. 1, 1935 |
| 2,271,028 | Olson | Jan. 27, 1942 |
| 2,332,026 | Suppeger | Oct. 19, 1943 |
| 2,337,667 | Kuehlman | Dec. 28, 1943 |